United States Patent [19]
Daffix et al.

[11] Patent Number: 4,936,525
[45] Date of Patent: Jun. 26, 1990

[54] COMPOSITE ROCKET MOTOR WITH INTEGRATED COMPOSITE FINS, AND METHOD OF MANUFACTURE

[75] Inventors: Louis Daffix, Pessac; Dino Crapiz, Le Haillan, both of France

[73] Assignee: Societe Europeenne De Propulsion, Suresnes, France

[21] Appl. No.: 342,483

[22] Filed: Apr. 24, 1989

[30] Foreign Application Priority Data

Apr. 25, 1988 [FR] France ............................... 88 05466

[51] Int. Cl.⁵ ..................... F02K 9/32; B29C 53/56; B29K 63/00
[52] U.S. Cl. ................................. 244/3.24; 242/7.01; 156/172; 264/257
[58] Field of Search ................ 244/3.24; 156/169, 171, 156/172, 91, 92; 242/7.01; 264/257; 102/293

[56] References Cited

U.S. PATENT DOCUMENTS

| | | | |
|---|---|---|---|
| 3,032,857 | 5/1962 | Lyon | 244/3.24 |
| 3,119,333 | 1/1964 | Loughram | 244/3.24 |
| 3,661,670 | 5/1972 | Pierpont, Jr. | 156/172 |
| 4,167,430 | 9/1979 | Arachi | 156/212 |
| 4,232,843 | 11/1980 | Clark et al | 244/3.29 |
| 4,592,525 | 6/1986 | Madderra et al. | 244/3.28 |
| 4,693,435 | 9/1987 | Percival et al. | 244/3.24 |

FOREIGN PATENT DOCUMENTS

1116577 11/1961 Fed. Rep. of Germany .
2556650 6/1985 Fed. Rep. of Germany .

*Primary Examiner*—Charles T. Jordan
*Assistant Examiner*—Michael J. Carone
*Attorney, Agent, or Firm*—Weingarten, Schurgin, Gagnebin & Hayes

[57] ABSTRACT

A tubular preform (10), fins (30), and fin supports (20) are made independently, with the fins and the fin supports being made by laying fibrous cloth impregnated with polymerizable binder to take up the appropriate shapes, and then polymerizing the binder, whereas the tubular preform is made by winding a thread impregnated with a polymerizable binder. Each fin support has a base integrated with the periphery of the tubular preform, and has fin attachment portions projecting from its base, with the bases of the fin supports and the periphery of the tubular preform being shaped in such a manner as to ensure circumferential continuity of the structure. The fin supports are integrated with the tubular preform by gluing together with at least one position of localized overwinding at the gaps in the fin supports between the fin attachment portions, thereby providing a perform which is smooth in structure both inside and outside. The assembly constituted by the tubular preform, the fin supports, and the overwinding is polymerized in order to obtain a tube for constituting a rocket, and the fins are subsequently assembled to the fin support by gluing the sides of the fins onto the attachment portion of the fin supports.

14 Claims, 3 Drawing Sheets

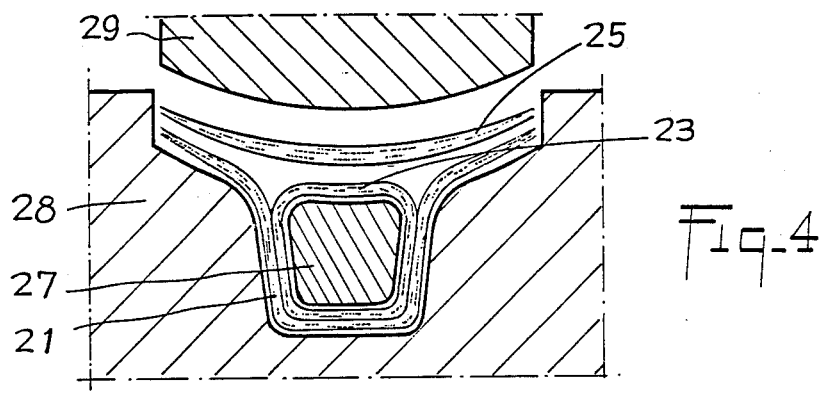
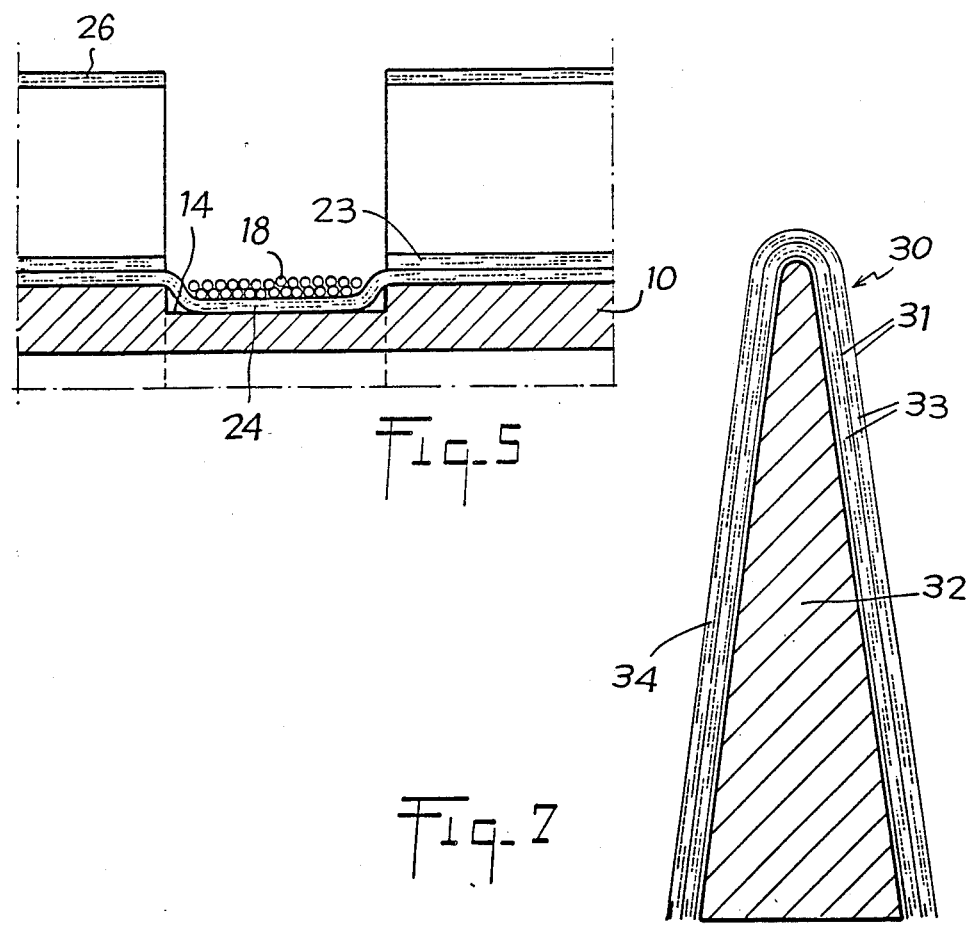

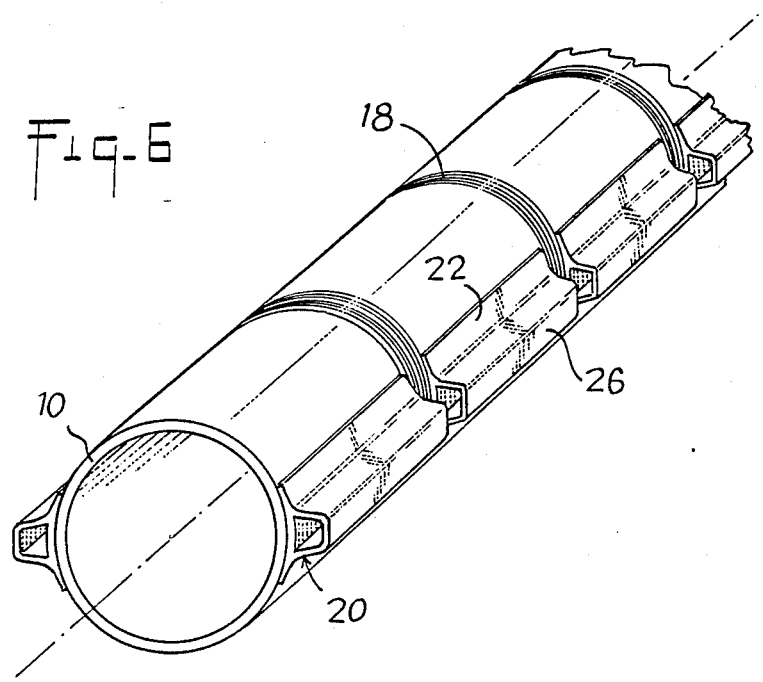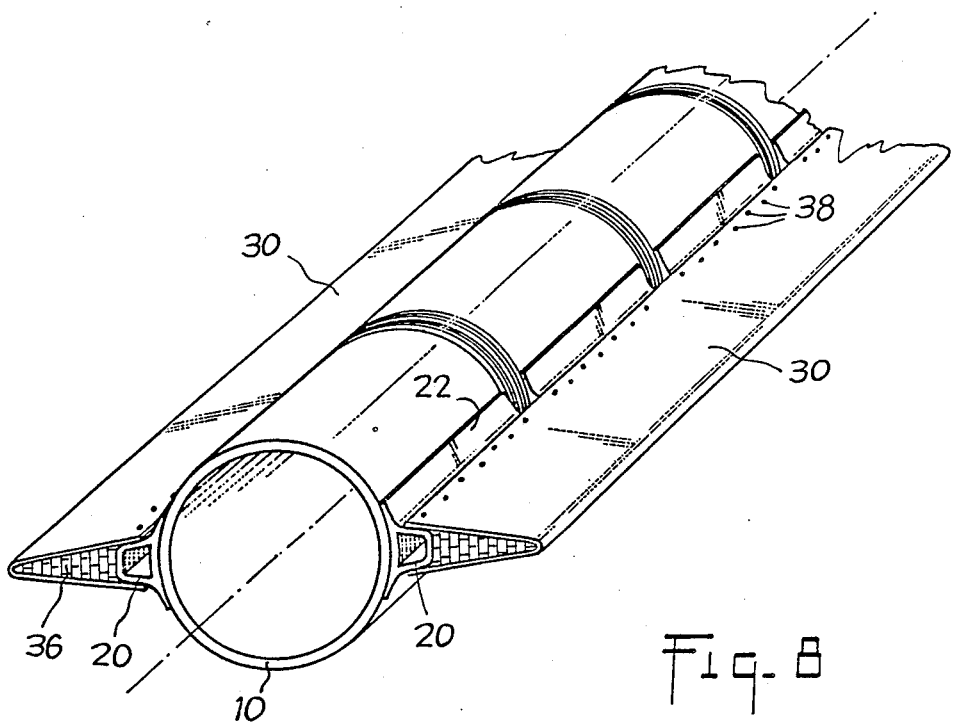

though the tube of the rocket motor, and this presents a problem of
COMPOSITE ROCKET MOTOR WITH INTEGRATED COMPOSITE FINS, AND METHOD OF MANUFACTURE The present invention relates to integrating composite fins in the structure of a composite rocket motor.

BACKGROUND OF THE INVENTION

The large forces to which the airfoil surfaces (fins) of current rockets are subjected by virtue of their high maneuverability generally need to be taken up by the tube of the rocket motor, and this presents a problem of mechanical connection between the fins and the tube.

Present rockets have localized anchor points on which the fins are fixed The resulting local forces make it necessary either to insert frames within the rockets or else to thicken the tube wall locally In addition to the resulting loss in solid fuel content, and thus in performance, these solutions give rise to major drawbacks in reusing the tubes because of their varying section, thereby having a major effect on manufacturing costs. In addition, such architectures limit the contribution of the fins to the stiffness of the rocket.

An improvement may be obtained by welding the fins to the metal tube of the rocket. Local reinforcements can then be omitted and the fins contribute better to the stiffness of the rocket. However, such a solution is naturally inapplicable to composite rockets.

Composite rockets fitted with composite fins have been made, but the fins were locally fixed to metal frames, thereby returning to the above-mentioned drawbacks for rockets having locally fastened fins.

An object of the present invention is therefore to provide a method of manufacturing a composite rocket motor enabling composite fins to be integrated into the structure of the rocket so as to enable the fins to contribute to rocket stiffness, thereby making it possible to embark a greater mass of fuel while retaining a structure which is smooth both on the inside and on the outside.

SUMMARY OF THE INVENTION

The present invention provides a method of manufacturing a composite rocket motor having composite fins, the method comprising the following steps:

(a) making a tubular preform, fins, and fin supports, separately;

the fins and the fin supports being formed at least in part by appropriately laying fibrous cloths impregnated with polymerizable binder, followed by polymerizing the binder, while the tubular preform is made at least in part by winding threads and by impregnation using a polymerizable binder;

each fin support including a base for integrating with the periphery of the tubular preform, and fin attachment portions projecting from the base and spaced apart therealong; and the bases of the fin supports and the periphery of the tubular preform are shaped in such a manner as to ensure circumferential continuity of the structure when the bases are integrated with the tubular preform;

(b) integrating the fin supports to the tubular preform by integrating the bases of the fin supports longitudinally to the periphery of the tubular preform, said integration being performed by gluing together with at least one localized overwinding operation at the locations on the fin supports situated between the fin attachment portions, such that a preform is obtained which is smooth in structure internally and externally;

(c) subjecting the assembly constituted by the tubular preform, the fin supports, and the overwinding to a polymerization treatment in order to obtain a tube; and (d) subsequently assemblying the fins to the fin supports at least by gluing the sides of the fins to the attachment portions of the fin supports.

Thus, the fins are connected to the tube without requiring metal frames to be added and without requiring significant increase in thickness of the tube wall, thereby increasing the mass of fuel that can be contained in the tube. Further, by integrating fin support bases in the structure of the tube, the fins contribute to the overall stiffness of the rocket.

In a particular implementation of the method of the invention, the base of each fin support includes set-back portions situated between fin attachment portions and intended to be disposed in annular grooves formed in the periphery of the tubular preform. Overwinding is then performed in the grooves of the tubular preform over the set-back portions of the fin support bases so as to improve the connection between each fin support and the tubular preform while also ensuring circumferential continuity of the structure.

In another aspect, the present invention also provides composite rocket motors obtained by implementing the abovedefined method.

The invention provides a composite rocket motor comprising a tube made of composite material and fins made of composite material and connected to the tube by means of fin supports, wherein each fin support is made of composite material and comprises:

a base integrated with the tube for forming together with the tube a structure having circumferential continuity, with the base being integrated with the tube by gluing together with localized overwinding; and attachment portions projecting from the base and on which the sides of a fin are assembled by means of gluing.

BRIEF DESCRIPTION OF THE DRAWINGS

An embodiment of the invention is described by way of example with reference to the accompanying drawings, in which:

FIG. 4 is a cross-section showing the positioning of pieces of cloth inside tooling for making a fin support;

FIG. 5 is a fragmentary longitudinal section showing a detail of the FIG. 3 fin support when assembled to the FIG. 1 preform;

FIG. 6 is a fragmentary perspective view showing the FIG. 3 fin support assembled to the FIG. 1 preform;

FIG. 7 is a cross-section through a fin for assembling to a fin support as shown in FIG. 3; and FIG. 8 is a perspective view showing a portion of a rocket motor made in accordance with the invention using the FIG. 1 preform, fin supports as shown in FIG. 3, and fins as shown in FIG. 7.

DETAILED DESCRIPTION

In general terms, a composite rocket motor is manufactured in accordance with the invention by making a tubular preform, fin supports, and fins separately from one another, by assembling the fin supports to the tubular preform, by polymerizing this assembly, and then by mounting the fins on the fin support. The fins and their supports may, for example, be two in number (as in the embodiments described below), or they may be four in number.

Figure 1:
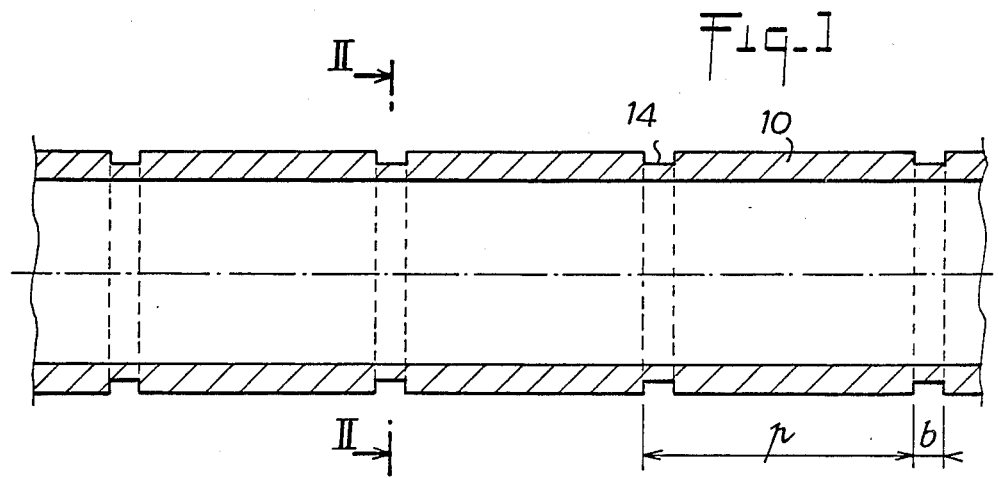
FIG. 1 is a diagrammatic longitudinal section view through a tubular preform for use in manufacturing the tube of a composite rocket motor in accordance with the invention.
Figure 2:
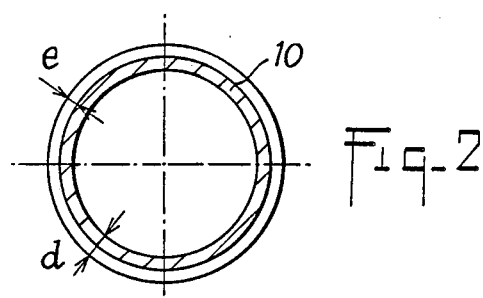
FIG. 2 is a cross-section through the FIG. 1 preform on a plane II—II.

One embodiment of a tubular preform to which fin supports are to be integrated is shown in FIGS. 1 and 2 This preform is intended to form a tube, i.e. a tubular cylindrical body, which together with front and rear ends delimits the chamber in which the solid fuel is disposed.

In conventional manner, the tubular preform is made by winding a fibrous cloth impregnated with a polymerizable binder such as epoxy resin. The cloth is made of a fiber, e.g. carbon fiber, which is wound on a mandrel. In a variant, the winding can be performed directly onto the block of solid fuel, together with an optional interposed heat protection layer, so long as the polymerization temperature of the binder is low enough to ensure that polymerization can be performed in the presence of the fuel. The thread is wound in several superposed layers. In some of the layers the thread is wound helically, e.g. alternating between alternating lefthand and righthand layers.

As shown in FIG. 1, the tubular perform 10 is made in such a manner as to have hollowed-out portions in its periphery constituted by annular grooves 14 for receiving corresponding portions of the fin supports.

The annular grooves 14 are formed at an axial pitch p. Each groove is of constant width b and of constant depth e (FIG. 2).

The annular grooves 14 are obtained by making the outside portion of the preform (which is otherwise of thickness d) by winding circumferentially over the entire length of the preform other than in the locations of the grooves.

Figure 3:
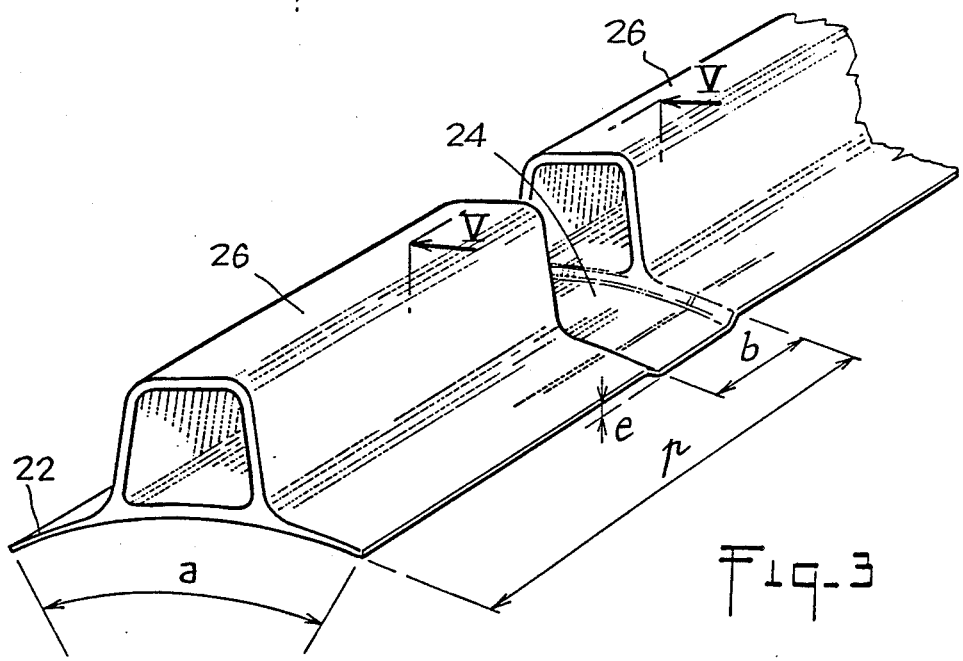
FIG. 3 is a perspective view on a larger scale showing a fragment of a fin support suitable for being assembled to the FIG. 1 preform.

FIG. 3 shows a fin support 20 for integrating with the preform 10. The fin support 20 comprises a base or sole 22 having attachment portions 26 in the form of box-section beams projecting therefrom, and having sides to which the fins are to be fixed.

The attachment portions are uniformly distributed along a fin support 20 and they are separated from one another by gaps in which the base or sole forms set-back portions 24.

The base or sole 22 is of varying shape in order to enable it to be integrated with the periphery of the tubular preform while substantially retaining circumferential continuity of the structure. Thus, the sole 22 has a rounded profile in right cross-section and its thickness tapers away from a central portion (from which the attachment portions project) towards its longitudinal edges. As a result, the top surface of the sole on either side of the attachment portions runs down progressively towards the outside surface of the tubular preform. The set-back portions 24 are disposed longitudinally at the same pitch p as the grooves 14 and they have the same width b as the grooves 14. The distance between the bottom surface in the sole 22 inbetween the set-back portions, and the bottom surface of the set-back portions 24 is equal to the depth e of the grooves 14.

When a fin support 20 is longitudinally integrated with a preform 10 (FIG. 5), then the set-back portions 24 penetrate into the grooves 14 and leave residual grooves. As mentioned below, the residual grooves are filled in by circumferential overwinding 18 so that a structure is obtained having complete circumferential continuity and which is smooth both inside and outside, along the entire length of the rocket motor. The number and width of the grooves 14 are chosen as a function of the forces that the fins need to absorb, which fins contribute to the stiffness of the rocket, by virtue of the fin support bases being integrated with the periphery of the tubular preform.

For example, for a preform 10 having an outside diameter of 160 mm and a thickness d equal to 4.5 mm, the grooves 14 may be provided at a pitch p equal to 120 mm, they may have a width b equal to 20 mm, and a depth e equal to 0.5 mm. The soles 22 may extend circumferentially over an arc a equal to 35°.

As shown more particularly in FIG. 4, the fin support 20 is formed by overlying layers of fibrous cloth, e.g. cloth made of carbon fibers, said cloth being impregnated with a polymerizable binder such as an epoxy resin. In the example shown, three subassemblies of fibrous cloth are used:

a first subassembly 21 constituting the outside portion of the box section beam 26 and comprising layers of two-directional two-dimensional cloth (e.g. woven cloth) with one-directional, two-dimensional layers of cloth (e.g. sheets of longitudinally oriented threads) interposed therebetween, with the subassembly 21 being placed around the bottom of a mold 28;

a second subassembly 23 comprising layers deposited on the first subassembly 21 and then laid around a core 27 defining the inside of the box section, the second subassembly 23 being formed, like the first subassembly, by one-directional sheets situated between layers of woven cloth; and a third subassembly of layers 25 laid over the first and second subassemblies in order to form the sole 22, said third subassembly being likewise formed of one-directional sheets situated between layers of woven cloth.

The assembly is polymerized in tooling constituted by the mold 28, a lid 29, and the core 27. The bottom of the mold 28 is appropriately shaped to form the sole 22 together with its set-back portions 24. The cover 29 has a rounded face pressed against the subassembly of layers 25 in order to impart the desired curvature to the sole. The core 27 is advantageously made of a substance having a high coefficient of expansion so as to put the fin supports under pressure while they are polymerizing. After polymerization, the core 27 is removed and the portions of the box section lying over the set-back portions 24 are moved by machining.

After shaping as described above, the fin supports 20 are integrated with the preform 10. To this end, the soles 22 of the fin supports are integrated with the periphery of the tube by interposing a glue. The glue used may be of the epoxy type, for example.

The assembly made in this way (FIGS. 5 and 6) is completed by circumferential winding over the set-back portions 24 received in the grooves 14. The overwinding is performed by means of a thread 18, e.g. epoxy resin impregnated carbon, until the outside diameter of the tubular preform has been built up so as to give the resulting structure a smooth outside appearance.

The assembly constituted in this way is subjected to a polymerization cycle during which the following are polymerized: the binder impregnating the winding thread from which the tubular preform is made; the binder impregnating the overwinding thread; and the glue interposed between each fin support and the preform. A tube is thus obtained in which the fin supports are perfectly integrated.

Each rocket fin is made of composite material. As shown in FIG. 7, each fin 30 is formed by laying two-dimensional fibrous cloth over a template 32. In the same manner as described above, the fibrous cloth may be constituted by carbon fiber cloth impregnated with a polymerizable binder such as epoxy resin, and may comprise a sandwich of woven layers 31 alternating with one-directional sheets 33. Some of the one-directional sheets may be disposed parallel to the longitudinal direction and others may be disposed perpendicularly thereto.

After the cloth has been put into place, the binder is polymerized while holding the cloth in position in tooling such as a die and punch assembly, in which case the template 32 may constitute the punch.

A reinforcing honeycomb structure 36 (FIG. 8) also made of composite material may be inserted between the sides 34 of the fin, after the template 32 has been removed, except between the end portions of the sides which are to be fixed to the attachment portions of the fin supports.

The fins 30 which are internally reinforced by the honeycomb structure 36 are applied to the fin supports by gluing the end portions of the sides onto the longitudinal side walls of the attachment portion 26 (FIG. 8). The glue used may be of the epoxy type, for example.

Gluing may be assisted and/or replaced by installing rivets 38.

The above-described method makes use of several polymerization operations which take place successively in time. As is well known to the person skilled in the art, it then becomes important for polymerization to be performed at successive temperatures which are not greater than previous polymerization temperatures.

Thus, the assembly constituted by the tubular preform together with the integrated fin supports is subjected to polymerization at a temperature T2 which is not greater than the temperature T1 to which the fin supports were raised in order to polymerize the binder impregnating the fibrous cloth from which the fin supports preforms were made. The temperatures T1 and T2 are closely determined by the binders (resins) used.

Similarly, after the fins have been put into place, if the gluing requires polymerization, then the polymerization is performed at a temperature which is not greater than T2 and which is not greater than the temperature T'1 to which the fins were raised during the polymerization operation to which they were subjected.

The rocket is then completed in conventional manner by installing the fuel, e.g. by casting it, and by adding front and rear end plates.

Advantageously, the aligned box sections formed by the attachment portions are used for constituting service tunnels or passages, e.g. for electrical conductors intended for conveying signals between the front and the rear of the rocket, thereby making it possible, in particular, to avoid adding external ducting specifically for this purpose.

The above-described method makes it possible to provide composite rockets having integrated composite fins without requiring significant local thickening of the tube or special metal anchor structures for the fins, thereby enabling extra fuel mass to be embarked and reducing the inert mass.

In addition, since the fins contribute to the stiffness of the rocket assembly, this stiffness can be modulated by acting on the way the fins are stratified. Further, by making the fins and the fin supports independently, they can be optimized individually.

In the above description, it is assumed that use is made of fibrous cloth based on carbon fibers impregnated with a polymerizable binder such as epoxy resin. Naturally, other fibers could be used for making the fibrous cloth, e.g. organic, ceramic, or metal fibers, and other materials could be used for impregnating or increasing the density of the fibrous cloth, said materials including thermoplastic materials, thermosetting materials, ceramics, and metals. In particular, when the rocket is exposed in operation to high levels of kinetic heating, it is possible to make the fins and the fin supports of composite material having good high-temperature performance, e.g. a composite material based on a ceramic matrix.

Finally, the soles of the fin supports could be completely integrated in the periphery of the tubular preform by forming additional set-back portions in the outside surface of the tubular preform in addition to its angular grooves, said additional set-back portions extending longitudinally and being intended to receive the soles of the fin supports all along the fin attachment portions.

We claim:

1. A method of manufacturing a composite rocket motor having composite fins, the method comprising the following steps:

making a tubular preform, fins, and fin supports, separately;

the fins and the fin supports being formed at least in part by appropriately laying fibrous cloths impregnated with polymerizable binder, followed by polymerizing the binder, while the tubular preform is made at least in part by winding threads and by impregnation using a polymerizable binder;

each fin support including a base for integrating with the periphery of the tubular preform, and fin attachment portions projecting from the base and spaced apart therealong; and the bases of the fin supports and the periphery of the tubular preform are shaped in such a manner as to ensure circumferential continuity of the structure when the bases are integrated with the tubular preform;

integrating the fin supports to the tubular preform by integrating the bases of the fin supports longitudinally to the periphery of the tubular preform, said integration being performed by gluing together with at least one localized overwinding operation at the locations on the fin supports situated between the fin attachment portions, such that a preform is obtained which is smooth in structure internally and externally;

subjecting the assembly constituted by the tubular preform, the fin supports, and the overwinding to a polymerization treatment in order to obtain a tube; and subsequently assembling the fins to the fin supports at least by gluing the sides of the fins to the attachment portions of the fin supports.

2. A method according to claim 1, wherein the base of each fin support has set-back portions situated between the fin attachment portions and intended to be disposed in annular grooves formed in the periphery of the tube and in which said overwinding is performed.

3. A method according to claim 1, wherein the fin supports are made with attachment portions in the form of box sections.

4. A method according to claim 1, wherein the sides of the fins are assembled to the attachment portions of the fin support by gluing, together with riveting.

5. A method according to claim 1, wherein a honeycomb reinforcing structure is inserted between the sides of the fins.

6. A composite rocket motor comprising a tube portion having a predetermined curvature defining a predetermined circumference, and made of composite material, and a plurality of fins having side portions and made of composite material, said plurality of fins connected to the tube portion by means of a corresponding plurality of fin supports, wherein each fin support is made of composite material and comprises:

a base portion having a curvature which corresponds to said predetermined curvature of said tube portion, and adapted for mating with the tube portion and for forming together with the tube portion a structure having circumferential continuity;

means for joining said base portion to said tube portion;

said base portion including fin attachment portions projecting from the base and to which the side portions of said fins are secured; and means for securing the side portions of said fins to said fin attachment portions.

7. A rocket motor according to claim 6, wherein the fin attachment portions in the fin supports are in the form of box sections.

8. A rocket motor according to claim 7, wherein the fin attachment portions of a fin support form a service passage running along the longitudinal axis of the rocket motor.

9. A rocket motor according to claim 6, wherein honeycomb structures are disposed between the side portions of the fins.

10. A rocket motor according to claim 6, wherein said means for securing the side portions of said fins to said fin attachment portions includes gluing and riveting.

11. A rocket motor according to claim 6 wherein the base portion of each of said fin supports extends parallel to a longitudinal axis which passes through said tube portion.

12. A rocket motor according to claim 6 wherein said base portion further includes set-back portions located between said fin attachment portions.

13. A rocket motor according to claim 12 wherein said means for joining said base portion to said tube portion includes glue means and localized overwinding over said base on portion and around the circumference of said tube portion.

14. A rocket motor according to claim 13 wherein said localized overwinding is positioned within said set-back portions of fin support base.

* * * * *